United States Patent
Duke et al.

(10) Patent No.: US 8,757,758 B2
(45) Date of Patent: *Jun. 24, 2014

(54) MULTIPLE SIDED MEDIA PATTERN REGISTRATION SYSTEM

(75) Inventors: Ronald J. Duke, Centerville, OH (US); Brad Smith, Xenia, OH (US); Thomas F. Powers, Webster, NY (US); Morgan A. Smith, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 377 days.

This patent is subject to a terminal disclaimer.

(21) Appl. No.: 13/217,631

(22) Filed: Aug. 25, 2011

(65) Prior Publication Data

US 2013/0050763 A1 Feb. 28, 2013

(51) Int. Cl.
*B41J 29/38* (2006.01)
*B41J 3/44* (2006.01)
*B41J 3/60* (2006.01)
*B41J 11/00* (2006.01)
*B41F 17/00* (2006.01)
*B41F 33/00* (2006.01)

(52) U.S. Cl.
CPC .. *B41J 3/445* (2013.01); *B41J 3/60* (2013.01); *B41J 11/009* (2013.01); *B41F 17/00* (2013.01); *B41F 33/0081* (2013.01)
USPC .......................................................... 347/16

(58) Field of Classification Search
CPC ............ B41J 3/445; B41J 3/60; B41J 11/009; B41F 17/00; B41F 33/0081
USPC .......... 347/5, 14, 16, 101, 102; 358/1.15, 1.18
See application file for complete search history.

(56) References Cited

U.S. PATENT DOCUMENTS 6,748,145 B2 * 6/2004 Border et al. .................... 385/52
6,765,603 B2 * 7/2004 Border et al. .................. 347/224

* cited by examiner

*Primary Examiner* — An Do
(74) *Attorney, Agent, or Firm* — William R. Zimmerli

(57) ABSTRACT

An image registration system for determining a relative location of a first pattern and a second pattern includes a fiducial having a fiducial origin, a first side, and a second side. A first camera captures a first fiducial image of the first side of the fiducial and the fiducial origin and a first pattern image of the first printed pattern. A second camera captures a second fiducial image of the second side of the fiducial and a second pattern image of the second printed pattern. An image registration controller processes the first fiducial image, the first pattern image, the second pattern image, and the second fiducial image to determine the relative location of the first pattern and the second pattern.

12 Claims, 10 Drawing Sheets

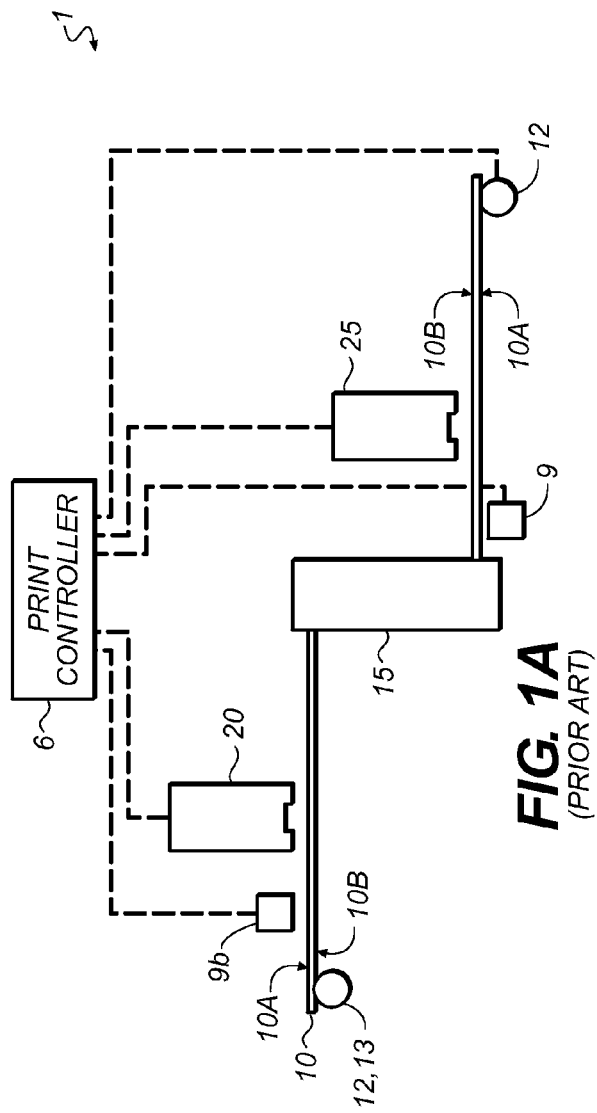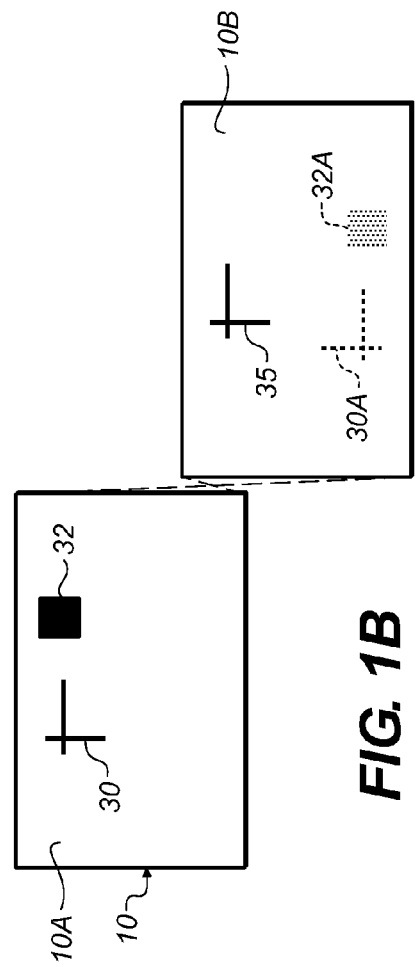
FIG. 1A (PRIOR ART)
FIG. 1B

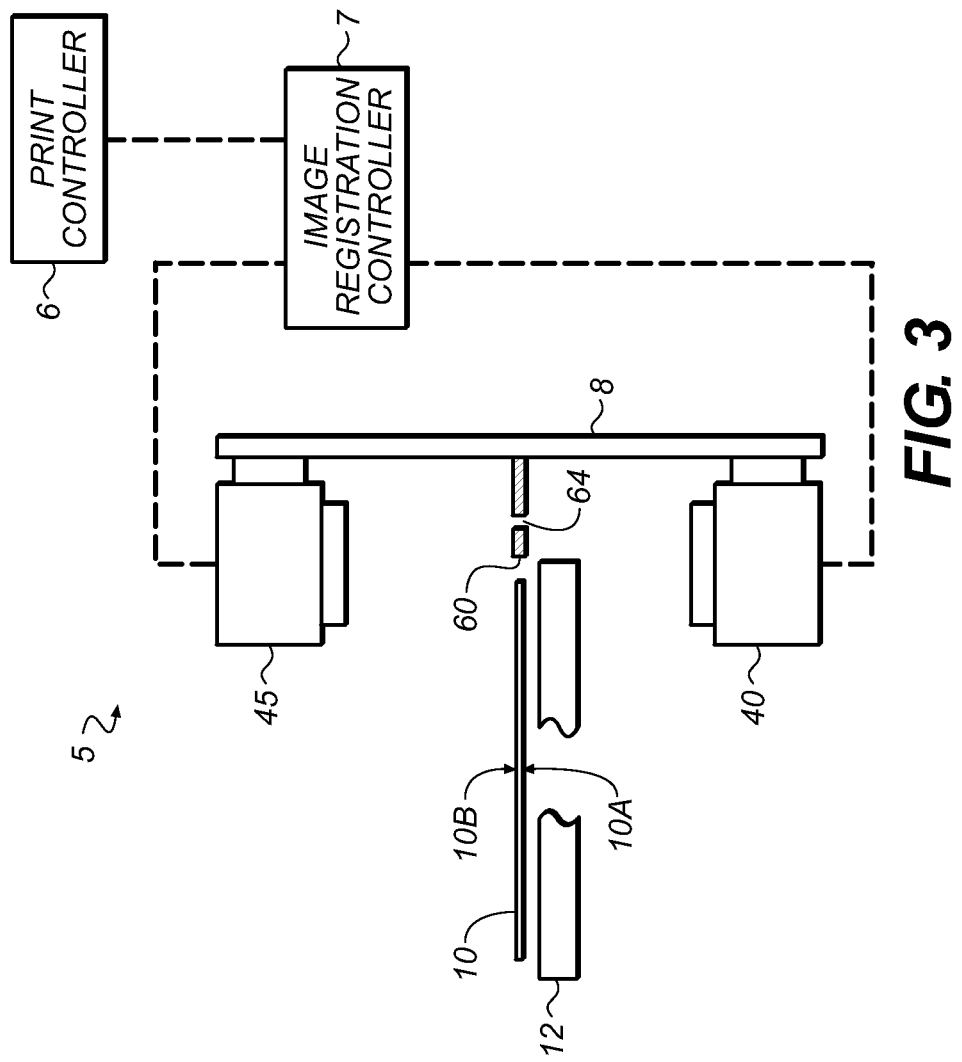

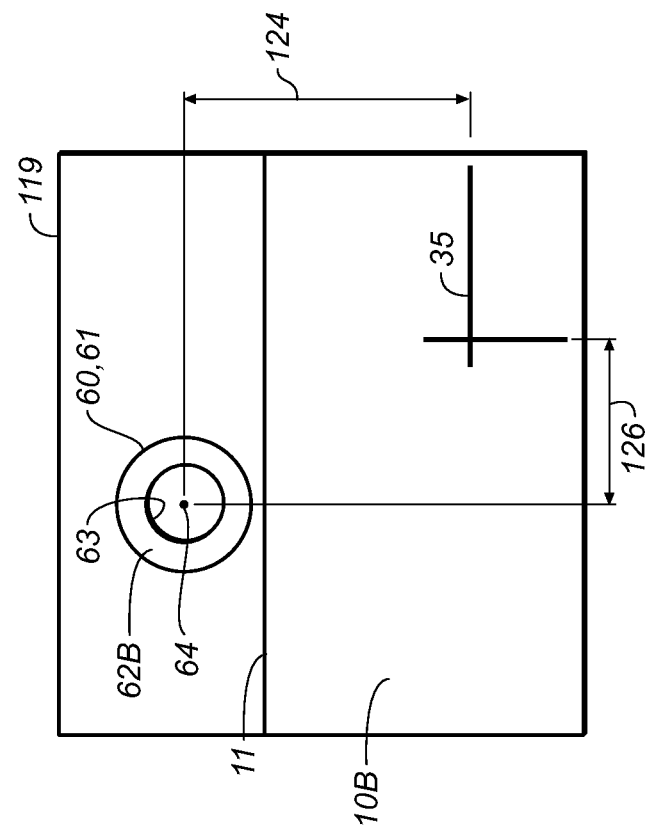
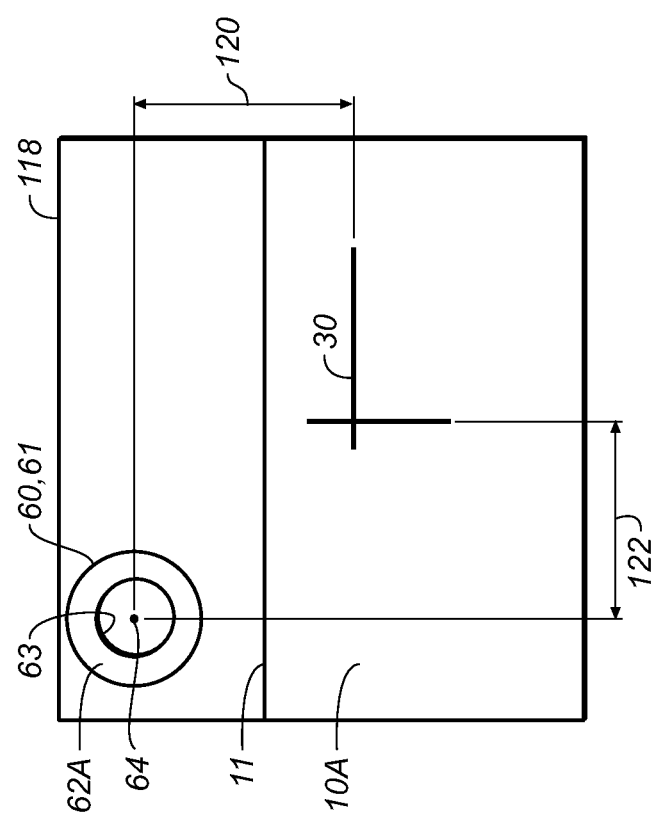

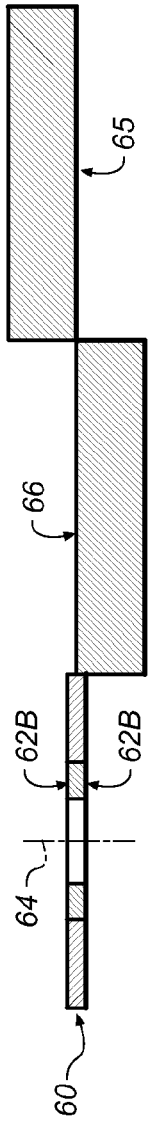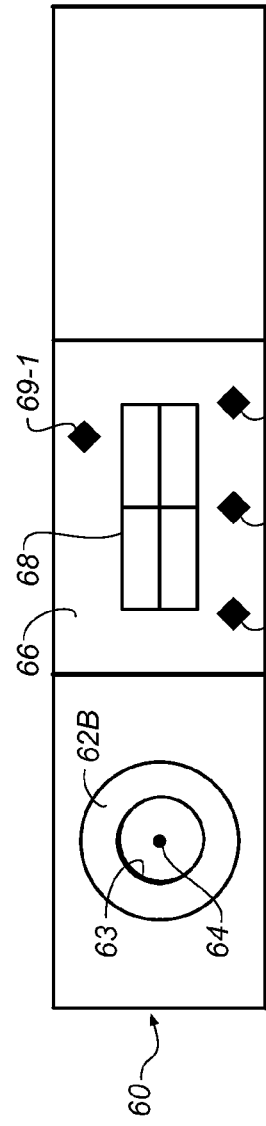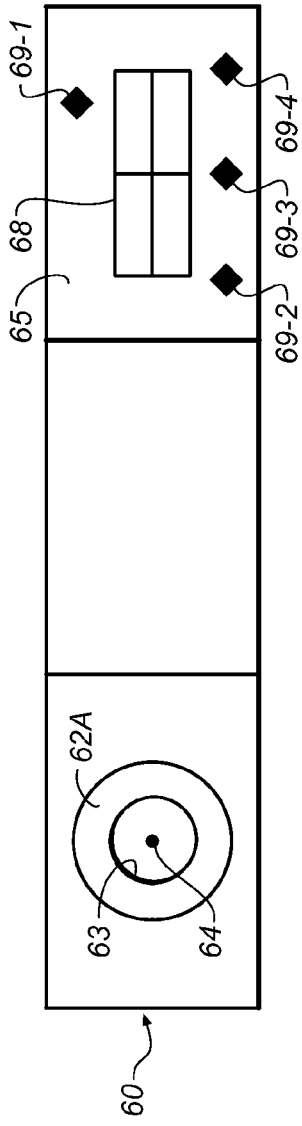

MULTIPLE SIDED MEDIA PATTERN REGISTRATION SYSTEM

CROSS REFERENCE TO RELATED APPLICATIONS

Reference is made to commonly-assigned, U.S. patent application Ser. No. 13/217,618 (now U.S. Pat. No. 8,632, 153), entitled "PRINTING SYSTEM HAVING MULTIPLE SIDED PATTERN REGISTRATION", Ser. No. 13/217,651 (now U.S. Pat. No. 8,500,234), entitled "REGISTERING PATTERNS ON MULTIPLE MEDIA SIDES", Ser. No. 13/217,665, entitled "PRINTING REGISTERED PATTERNS ON MULTIPLE MEDIA SIDES", all filed concurrently herewith.

FIELD OF THE INVENTION

This invention relates generally to the field of digitally controlled printing systems, and in particular to the registration of patterns, for example, images or text, printed by these systems.

BACKGROUND OF THE INVENTION

Printing systems configured to print on a front side of a print media and on a back side of a print media are known. Typically, a pattern, for example, an image or text, is printed on the front side of the print media using one portion of the printing system. Then, after transportation of the print media to another portion of the printing system, and a second pattern, for example, an image or text, is printed on the back side of the print media.

As ink is applied to the print media by the printheads of the printing system, it is absorbed by the print media, causing the print media to expand. This expansion occurs in both in-track and crosstrack directions, and often varies from edge to edge on the same side of the print media and from front side to back side of the print media. Expansion of the print media often adversely affects the alignment of the print media relative to the media transport of the printing system which may lead to a reduction in print quality. Additionally, the absorption of ink by the print media, often in combination with the environment, for example, temperature or humidity conditions, in which the printing system is operated, often causes the print media to stretch during printing which may lead to a reduction in print quality.

In order to achieve an acceptable level of print quality, patterns printed, for example, on the front side of a print media should be properly registered with patterns printed on the back side of the print media. As such, there is an ongoing need to improve the registration of patterns printed by printing systems.

SUMMARY OF THE INVENTION

According to one aspect of the invention, an image registration system for determining a relative location of a first pattern, for example, printed on a first side of a print media, and a second pattern, for example, printed on a second side of the print media is provided. The image registration system includes a fiducial having a fiducial origin, a first side, and a second side. A first camera captures a first fiducial image of the first side of the fiducial and the fiducial origin and a first pattern image of the first pattern printed on the first side of the print media. A second camera captures a second fiducial image of the second side of the fiducial and a second pattern image of the second pattern printed on the second side of the print media. An image registration controller processes the first fiducial image, the first pattern image, the second pattern image, and the second fiducial image to determine the relative location of the first pattern and the second pattern.

BRIEF DESCRIPTION OF THE DRAWINGS

In the detailed description of the preferred embodiments of the invention presented below, reference is made to the accompanying drawings, in which:

FIG. 1A is a schematic side view of a conventional printing system used for printing on a front side of a print media and a back side of the print media;

FIG. 1B is a schematic isometric view of the print media, showing the positions of a first pattern printed on the first side of the print media and a second pattern on the second side of the print media;

FIG. 3 is a schematic cross section view a digital printing system, taken along line A-A of FIG. 2, showing an embodiment of the image registration system;

FIGS. 4A and 4B show a first registration image captured by the first camera that includes the fiducial origin and the first pattern, and a second image registration image that includes the fiducial origin and the second pattern with the image shown in FIG. 4B having been flipped vertically to account for the mirror image perspective of the second camera;

FIGS. 9A-9C show the fiducial, in cross section (FIG. 9A), from a top focal plane (FIG. 9B), and from a bottom focal plane view (FIG. 9C), used to calibrate the magnification and focus of the first and second cameras.

DETAILED DESCRIPTION OF THE INVENTION

Figure 2:
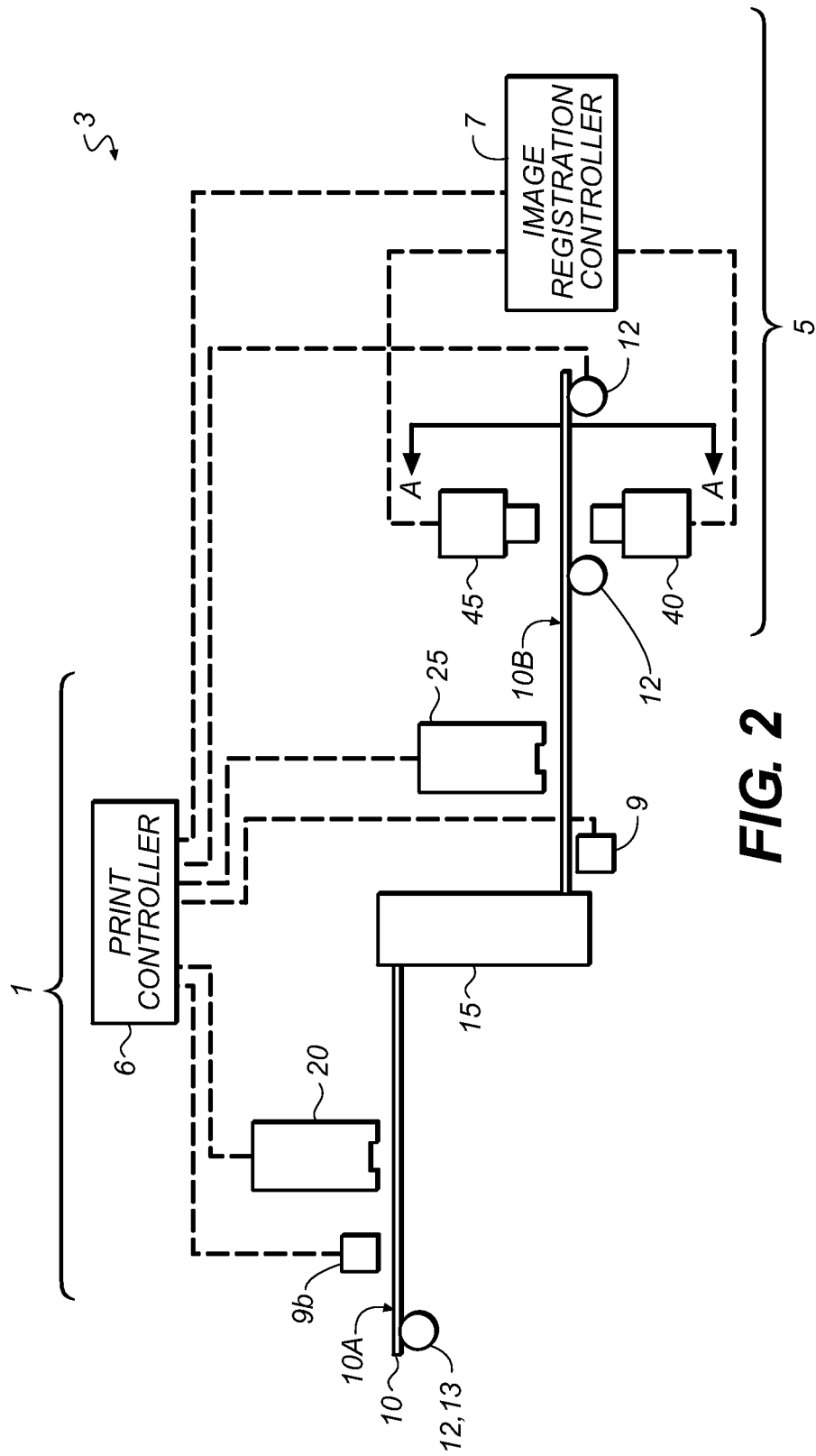
FIG. 2 is a schematic side view of a digital printing system including an image registration system for registering the first pattern printed on the first side of the print media and the second pattern printed on the second side of the print media according to one embodiment of the invention.

The present description will be directed in particular to elements forming part of, or cooperating more directly with, apparatus in accordance with the present invention. It is to be understood that elements not specifically shown or described may take various forms well known to those skilled in the art.

In the following description and drawings, identical reference numerals have been used, where possible, to designate identical elements.

The example embodiments of the present invention are illustrated schematically and not to scale for the sake of clarity. One of ordinary skill in the art will be able to readily determine the specific size and interconnections of the elements of the example embodiments of the present invention.

It should be understood that elements and components may be referred to in singular or plural form, as appropriate, without limiting the scope of the present invention. Additionally, references such as first, second, etc. are intended only for reference purposes only, and should not be interpreted to mean that any specific order is intended or required for the present disclosure to function properly.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

The invention described herein is suitable for use with either type of inkjet printing process or with other types of digital printing processes including, for example, flow through liquid dispensing processes, electrophotographic printing processes, or thermal printing processes.

As described herein, the example embodiments of the present invention provide printing systems or registration systems typically used in inkjet printing systems. However, many other applications are emerging which use inkjet printheads to emit liquids (other than inks) that need to be finely metered and deposited with high spatial precision. In addition to inks, for example, either water based or solvent based, that include one or more dyes or pigments, these liquids also include various substrate coatings and treatments, various medicinal materials, and functional materials useful for forming, for example, various circuitry components or structural components. Such medicinal materials include those applied to dermal and transdermal medicinal patches, used to deliver a specific dose of medication to the skin or through the skin. As such, as described herein, the terms "liquid" and "ink" refer to any material that is ejected by the printing systems or printhead described below. Additionally, the term print media is intended to include various media types, including, for example, paper, paperboard, cardboard, vinyl, medicinal patch substrates, and substrates used in printed circuitry, such as polyimide (including Kapton®), PEEK, and transparent conductive polyester.

Referring to FIG. 1A, a conventional printing system 1 for printing on a first side 10A and a second side 10B of the print media 10 is shown. An isometric view of the print media 10 is shown in FIG. 1B. The printing system 1 includes a print controller 6 that controls a first printhead 20 and a second printhead 25. The print media 10 is transported through the printing system 1, relative to the first and second printheads 20, 25, via a media transport system 12 that is also controlled by print controller 6.

The print media 10 is a continuous strip of media, commonly referred to as a continuous web of print media, which is caused to move along a travel path through media transports system 12. The media transport system 12 typically includes drive rollers, web guide rollers, and web tension devices. The print media 10 is routed through the media transport system 12, and tension within the media transport system 12 provides friction between the drive rollers and the print media 10 to prevent slipping. As such, each rotation of the drive rollers can be correlated to a linear length or travel of print media 10 that has been transported within the printing system 1. Typically, at least one of the drive rollers includes an encoder 13 which creates a defined number of pulses per revolution of the drive roller. The circumference of the drive roller and the defined number of pulses per revolution of the encoder 13 are used by the print controller 6 to determine the print media travel within the printing system 1.

As the print media 10 is transported through the printing system 1, the first side 10A of the print media 10, commonly referred to as a front side, passes beneath the first printhead 20 to be printed. The print media 10 is subsequently inverted by a turnover mechanism 15, such that the second side 10B of the print media 10, commonly referred to as a back side, faces a second printhead 20 for printing. The first printhead 20 prints a cue mark 32 (shown in FIG. 1B) on the first side 10A of the print media 10. After the print media 10 is inverted by the turnover mechanism 15, there is a cue sensor 9 that communicates with the print controller 6 upon sensing the cue mark 32, providing the print controller 6 with a reference point from which to determine the print media travel. The cue sensor 9 is typically a photo diode or other light sensitive device, camera, or image capture device that is capable of sensing the difference in light reflected off of the blank print media 10 versus the light reflected from the printed cue mark 32. Alternatively, print media 10 includes pre-printed cue marks that are sensed by the cue sensor 9. When pre-printed cue marks are included on print media 10, another cue sensor 9b is used to detect the cue mark to enable the first side image to be positioned relative to the pre-printed cue mark.

Referring to FIG. 1B, print media 10 includes a first pattern 30 printed on the first side 10A of the print media 10 at a first target location and a second pattern 35 printed on the second side 10B of the print media 10 at a second target location. Each target location is defined with an in-track location along the direction of media travel and a crosstrack location perpendicular to the direction of media travel. The in-track location is used to refer to the location along the length of the print media 10, whereas crosstrack location is used to refer to the location across the width of the print media 10. The first and second target locations also have a corresponding relative position, shown by an inverted first pattern 30A. The relative position includes a relative in-track location and a relative crosstrack location.

The process for positioning the print in the in-track direction differs from the process for positioning the print in the crosstrack direction. As the print media 10 is transported through the printing system 1, the first and second target in-track locations on the print media are moving relative to the printheads. The first and second printheads 20, 25 are cued to print when the appropriate first and second in-track target locations are passing beneath them. As such, the print controller 6 determines a first cue time, accounting for the flight time of the print drops from the printhead to the print media, when the first target in-track location is passing beneath the first printhead 20. At the first cue time, the first printhead 20 is cued to print the first pattern 30.

After the first pattern 30 is printed and the print media 10 is transported through the printing system 1, the print controller 6 determines the print media 10 travel between the first and second printheads 20, 25, in order to determine a second cue time, when the second target in-track location is passing beneath the second printhead. At the second cue time, the second printhead 25 is cued to print the second pattern 35.

As the print media 10 is transported along the transport path, the print controller signals the first printhead 20 to print the cue mark 32 and after an appropriate cue delay (a first cue delay) to print the first pattern 30. The cue delay is normally measured in terms of a number of encoder pulses. After the print media 10 is inverted by the turnover mechanism 15, the cue mark 32A passes and is detected by a cue sensor 9. After an appropriate cue delay (a second cue delay), which accounts for the distance between the cue sensor 9 and the second printhead 25 as well as the desired placement of the second pattern 35 relative to the cue mark 32A, the second printhead 25 prints the second pattern.

While printing at in-track target locations depends tracking the motion of the print media 10 as it travels through the printing system, printing at the first and second crosstrack target locations depends on the mechanical crosstrack alignment of the first and second printheads 20, 25 relative to the print media 10, and depending on which nozzles in the first and second printheads 20, are used for printing. Typically, the first and second printheads 20, 25 include overlapping nozzle arrays that cover the crosstrack, or width, of the print media 10. The print controller 6 controls which nozzles are selected to jet ink onto the print media 10 in order to print at the first and second crosstrack target locations.

As ink is jetted onto the print media 10, it is absorbed, causing the print media 10 to expand in both in-track and crosstrack directions. Drying the ink on the print media typically involves the application of heat to the print media, drying not only the ink, but also causing the moisture content of the non-printed portions of the print media to drop. As the moisture content of the print media drops, in both the printed and non-printed regions, the print media typically shrinks in both the in-track and crosstrack directions. In-track expansion causes the print media 10 to increase in length, which affects the determination of the print media 10 travel, because the encoder 13 within the media transport system 12 has a fixed circumference and defined number of pulses per revolution. Due to the increase in length of the print media 10, more revolutions of the encoder 13 within the media transport system 12 would be required in order to compensate for the increased length of the print media 10. Absent any compensation, when the print controller 6 cues the second printhead 25 to print the second pattern 35, the print media travel is actually less than required for the correct relative in-track location between the first and second patterns 30, 35. As such, the registration of second pattern 35 and the first pattern 30 would be incorrect.

Compensating for expansion is further complicated by differences in print coverage. For example, if the first pattern 30 printed on the front side 10A of the print media 10 requires heavy coverage and the back side 10B requires only light coverage, the print media 10 will expand at different rates. Additionally, when the coverage area varies in the crosstrack direction, the in-track expansion will vary across the print media 10. This will cause the print media 10 to drift as the print media 10 moves along the media transport system 12, as the tension is not uniform across the drive rollers. As the print media 10 drifts, the crosstrack locations of the first and second patterns 30, 35 are affected.

Additionally, operating conditions, such as temperature and humidity, also affect the print media 10 expansion. As the printing system 5 warms up or as operation conditions change, the temperature and humidity within the printing system will change, which affects ink absorption, the rate at which is dries, etc., thus affecting the both in-track and crosstrack expansion.

The printing system 1 includes features for calibration, for example during initial setup or maintenance cycles, in order to ensure registration of the first pattern 30 and the second pattern 35. Calibration typically requires the printing of test patterns and mechanical adjustment of components to determine the time of flight, print media travel, and nozzle selection. However, this type of calibration often necessitates that the printing system 1 be offline. The issues described above, however, often occur during normal printing operation after calibration. As such, it is often necessary to determine and calibrate the registration of the first and second patterns 30, 35, not only during initial printing system 1 installation and setup, but during normal printing operations.

As described herein, the example embodiments of the present invention include printing systems and components for determining the registration of patterns, for example, images or text printed, on a first side and a second side of a print media.

Referring to FIG. 2, a digital printing system 3 that includes an image registration system 5 for registering images printed on the first side 10A and the second side 10B of the print media 10, in addition to the components described above with reference to FIG. 1A, is shown. The image registration system 5 includes a first camera 40 and a second camera 45 located downstream of the second printhead 25. The first camera 40 is positioned to view and capture images of the first side 10A of the print media 10 and the second camera 45 is positioned to view and capture images of the second side 10B of the print media 10. The first and second cameras 40, 45 transfer the captured images to an image registration controller 7, which processes the images and transmits data related to the relative placement of the first and second side printed images to the print controller 6, enabling the print controller to correct the registration of subsequently printed patterns on the first and second sides of the print media.

Referring to FIG. 3, an example embodiment of the image registration system 5, viewed along line A-A in FIG. 2, is shown. The first camera 40 is positioned below a fiducial 60 and the second camera 45 is positioned above the fiducial 60. In addition to being able to view the fiducial 60, the first and second cameras 40, 45 can also view at least a portion of the first side 10A and the second side 10B of the print media 10, respectively. In this arrangement, the first and second patterns 30, 35 are printed within the portions of the print media viewable by the first and second cameras 40, 45, respectively. The first and second cameras 40, 45 and the fiducial 60 are attached to a structural component 8, so that these components do not move relative to each other during printing operations. Adjustment features to accommodate for installation and mechanical alignment, however, can be included.

The fiducial 60 is typically a thin piece of rigid material that includes a feature that can be viewed by both the first and second cameras, 40 and 45. A preferred embodiment of the feature is a through hole surrounded by a highly reflective material, such as the hole in a washer made of a metal, plastic, or ceramic. Preferably the washer is thin and the axis of the through hole is aligned parallel to the optical axis of the cameras so that there is no offset in the center of the through hole detected by the two cameras. The center of the through hole serves as a fiducial origin 64, which is a single reference point that is identifiable by the first camera 40 and the second camera 45. In order to provide the single reference point, the fiducial 60 should be positioned such that the fiducial origin 64 is in, or approximately in, the same focal plane as the print media 10.

In another example embodiment, the fiducial 60 includes a metallization layer on a side of a transparent substrate, in which the metallization layer includes a feature that can be readily detected by the first and second cameras, and from which a precise location can be determined. A photomask with an appropriate pattern is an example of this type of fiducial. The features can be either in the form of openings surrounded by metallization background regions or as metalized regions with open or non-metalized background regions. The center of a circle, the point of intersection of two lines, and the intersection point of two squares that touch at a single corner point like the squares of a checkerboard, are examples of locations that can be precisely determined from detected features that can serve as fiducial origins.

Referring back to FIG. 2, in some example embodiments of the invention, a component of the media transport system 12, for example, a roller, is located near the image registration system 5 in order to provide support the print media 10 so that the print media doesn't flutter in the field of view of the cameras 40, 45. The first and second cameras 40, 45 are positioned such that the media transport system 12 does not interfere with viewing the respective sides of the print media 10.

FIGS. 4A and 4B show a first registration image 118 and a second registration image 119, respectively. FIG. 4B has flipped (mirror imaged) horizontally to compensate for the different perspective of the second camera 45 relative to the first camera 40. The first registration image 118 is captured by the first camera 40 as the first pattern 30 printed on the first side 10A of the print media 10 is transported past the first camera 40. The fiducial 60 is located adjacent to a first edge 11 of the print media 10, such that the first pattern 30 and the fiducial 60 are captured within a single first registration image 118. Similarly, a second registration image 119 is captured by the second camera 45 as the second pattern 35 printed on the second side 10B of the print media 10 passes the second camera 45. The fiducial is located adjacent to the first edge 11 of the print media 10, such that the second pattern 35 and the fiducial are captured within the second registration image 119. Typically a strobe light (not shown) associated with each camera is used to illuminate the camera field of view, including the fiducial and the print media including the pattern, to enable an image to be captured without motion blur.

As shown in FIGS. 4A and 4B, the fiducial 60 is a washer 61, having a first reflective surface 62A and a second reflective surface 62B and a through hole 63 passing through the washer from the first reflective surface to the second reflective surface. The first and second reflective surfaces 62A and 62B provide high contrast to the through hole 63 when illuminated by a flash from the strobe lights associated with each of the first and second cameras 40, 45. This high contrast produces better images for the image registration controller 7 to process. The location of the center of the through hole can be readily determined in the first registration image 118 using image analysis software or firmware. Similarly the location of the center of the through hole can be readily determined in the second registration image 119 using image analysis software or firmware. The centerpoints determined from both the first and the second registration images must correspond to the same location. The center of the hole is used as the fiducial origin 64 for both the first and the second registration images 118, 119. The image registration controller 7 processes the first registration image 118, determining to determine the two components of the location of the first pattern 30, the first pattern crosstrack location 120 and the first pattern in-track location 122, relative to the fiducial origin 64. Similarly the second registration image 119 is processed by the image registration controller 7 to determine a second pattern crosstrack location 124 and a second pattern in-track location 126 relative to the fiducial origin 64. By comparing the first in-track and crosstrack locations 120 and 122 with the second in-track and crosstrack locations 124 and 126 the position of the second pattern 35 can be determined relative to the first pattern 30.

Figure 5:
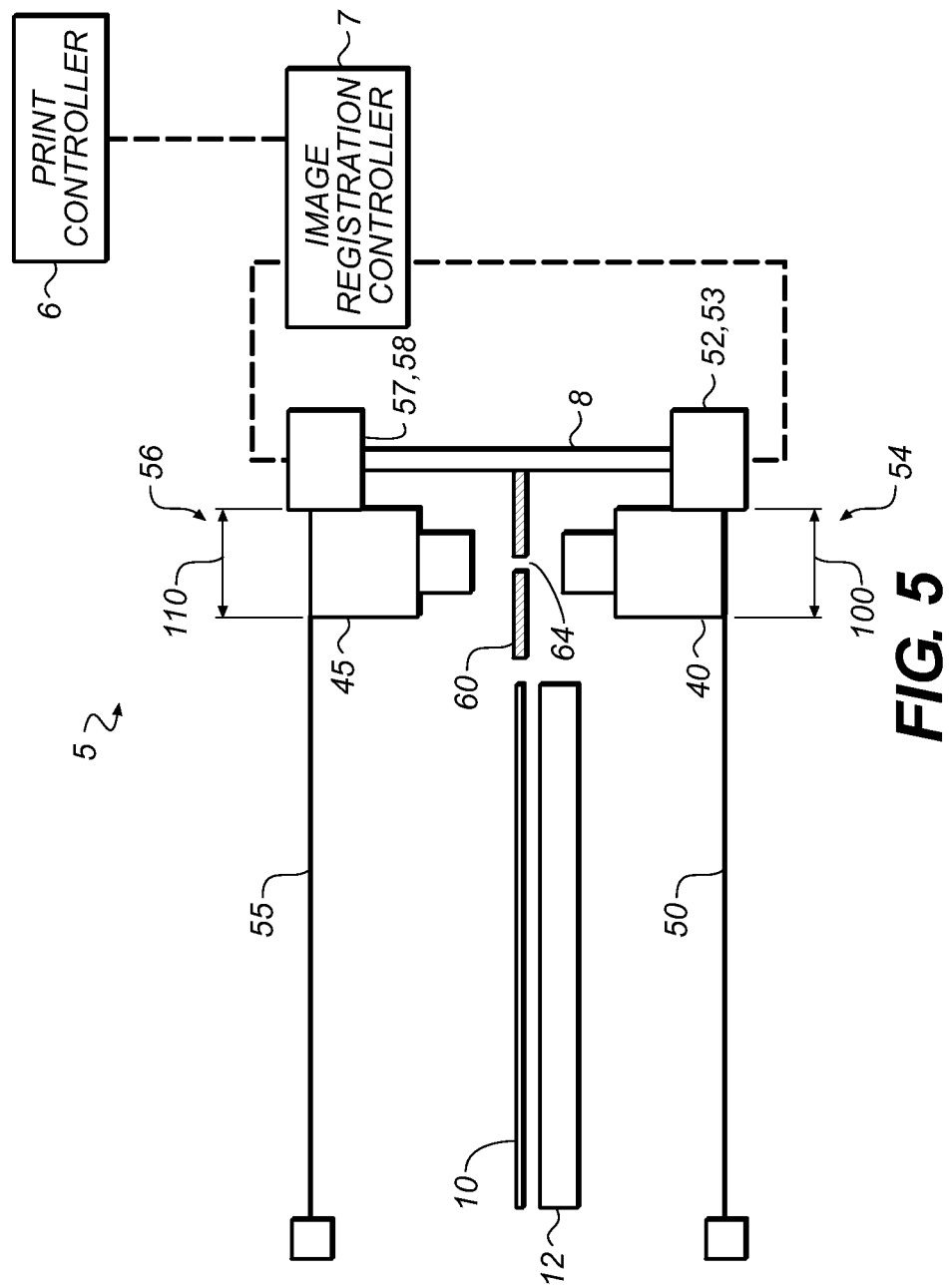
FIG. 5 is a cross section of the image registration system, taken along line A-A of FIG. 2, showing the first camera and the second camera where each camera is positioned to view the fiducial and the fiducial origin.

Referring to FIG. 5, another example embodiment of the image registration system 5, as viewed along line A-A in FIG. 2, is shown. In this embodiment, the first and second cameras 40, 45 are movable in the crosstrack direction. The first camera 40 is attached to a first camera guide 50, such that the first camera 40 is movable in the crosstrack direction, across the path of the first side 10A of the print media 10. A first drive system 52 provides the motive force to move the first camera 40 across the first camera guide 50. The first drive system 52 is communicatively attached to the image registration controller 7, which signals the first drive system 52 to move the first camera 40 in the crosstrack direction. The first camera drive system 52 can include a first encoder 53 that provides a first camera position signal to the image registration controller 7 to indicate the crosstrack position 100 of the camera along the first camera guide 50. In a similar arrangement, the second camera 45 is attached to a second camera guide 55. There is a second drive system 57 that provides the motive force to move the second camera 45 across the second camera guide 55. In order to determine and control the position of the second camera 45, the second camera drive system 57 includes a second encoder 58 that provides a second camera position signal to the image registration controller 7 to indicate the crosstrack position 110 of the camera along the camera guide 55. In an alternative embodiment, stepper motors are used to move the cameras. As the cameras move a known amount per stepper motor pulse, a process of counting the forward and reverse stepper motor pulses can be used to provide a measurement of the camera positions. Typically, each camera 40, 45 is at the crosstrack home position 54 and 56 when positioned to capture an image of the fiducial 60. The crosstrack home position is usually defined to be the zero position for each camera 40, 45.

Figure 6B:
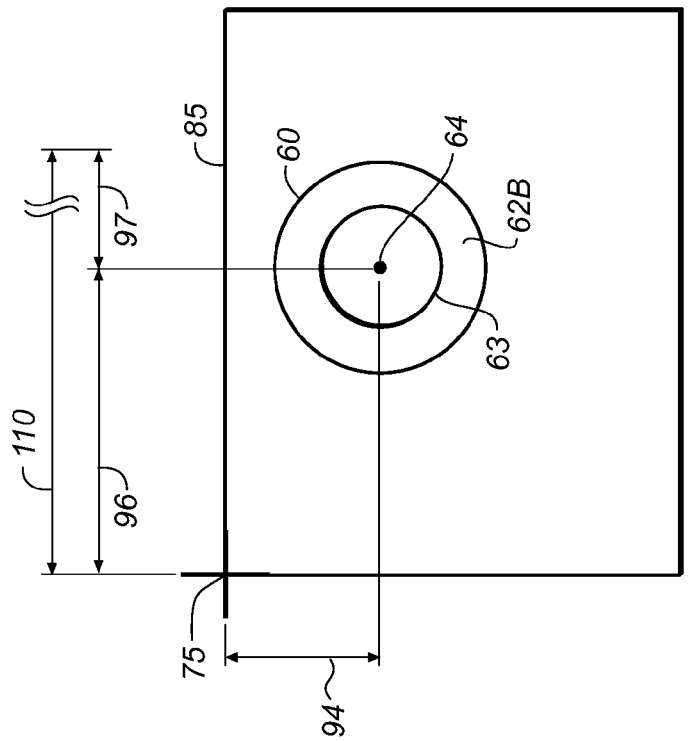
FIGS. 6A and 6B show a first fiducial image captured by the first camera used to determine a first origin and a second fiducial image captured by the second camera used to determine a second origin.
Figure 6A:
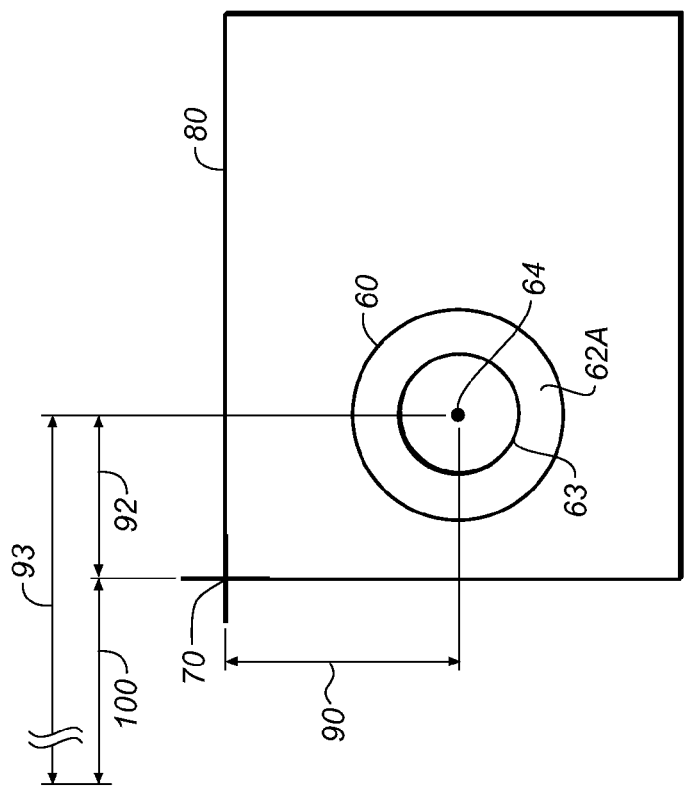

Referring to FIG. 6A, a first fiducial image 80, captured by the first camera 40 when positioned below the fiducial 60 (as shown in FIG. 5) is shown. The first fiducial image 80 is transmitted to and processed by the image registration controller 7. The image registration controller 7 converts the first fiducial image 80 into a bitmap and determines the first fiducial image in-track location 90 and a first fiducial image crosstrack location 92 for the center 64 of the through hole 63 relative to a first camera origin 70. Typically the camera origin 70 corresponds to the top left pixel in the camera image. The first fiducial image crosstrack location 92 is combined with the first camera crosstrack position 100 (typically zero) to yield a first absolute crosstrack position 93 for the fiducial origin 64. Combining a first fiducial image crosstrack location 92 with the camera crosstrack position 100 can involve adding the two values together or subtracting the fiducial image crosstrack location 92 from the camera crosstrack position 100 to yield the image absolute location 93, depending on whether the positive axis of the camera is aligned with the positive axis of the camera guide or is in the opposite direction (as shown in FIGS. 6A and 6B). Combining an image crosstrack location 92 with the camera crosstrack position 100 to yield the image absolute location 93 usually also involves scaling one or the other measured location values so that the units match, such as converting the image crosstrack location 92 from pixel units to microns to match the units of the camera crosstrack position 100 values. As the camera 40 is not moved in the in-track direction, the first absolute in-track position equals the first fiducial image in-track location 90.

Similarly, as shown in FIG. 6B, a second fiducial image 85, captured by the second camera 45 when positioned above the fiducial 60 (shown in FIG. 5). The second fiducial image 85 is also transmitted to and processed by the image registration controller 7. The image registration controller 7 processes the second fiducial image 85 and determines a second fiducial image in-track location 94 and a second fiducial image crosstrack location 96. The second fiducial crosstrack location 96 is combined with the second camera crosstrack location 110 (typically zero) to yield a second absolute crosstrack location 97 of the fiducial origin 64. The second absolute in-track location equals the second fiducial image in-track location 94. As shown in FIGS. 6A and 6B, neither the fiducial 60 nor the fiducial origin 64 need be centered within the first and second fiducial images 80, 85 in order to determine the first and second fiducial origins 70, 75.

The through hole 63 creating the fiducial origin 64 allows the fiducial origin 64 to be viewable by both the first camera 40 and the second camera 45, such that the first and second cameras are able to determine first and second absolute locations respectively for the common fiducial origin 64. Comparing the first and second absolute locations for the common fiducial origin 64 enables the offset between the first coordinate system associated with the first camera and the second coordinate system associated with the second cameras to be determined.

Figure 7:
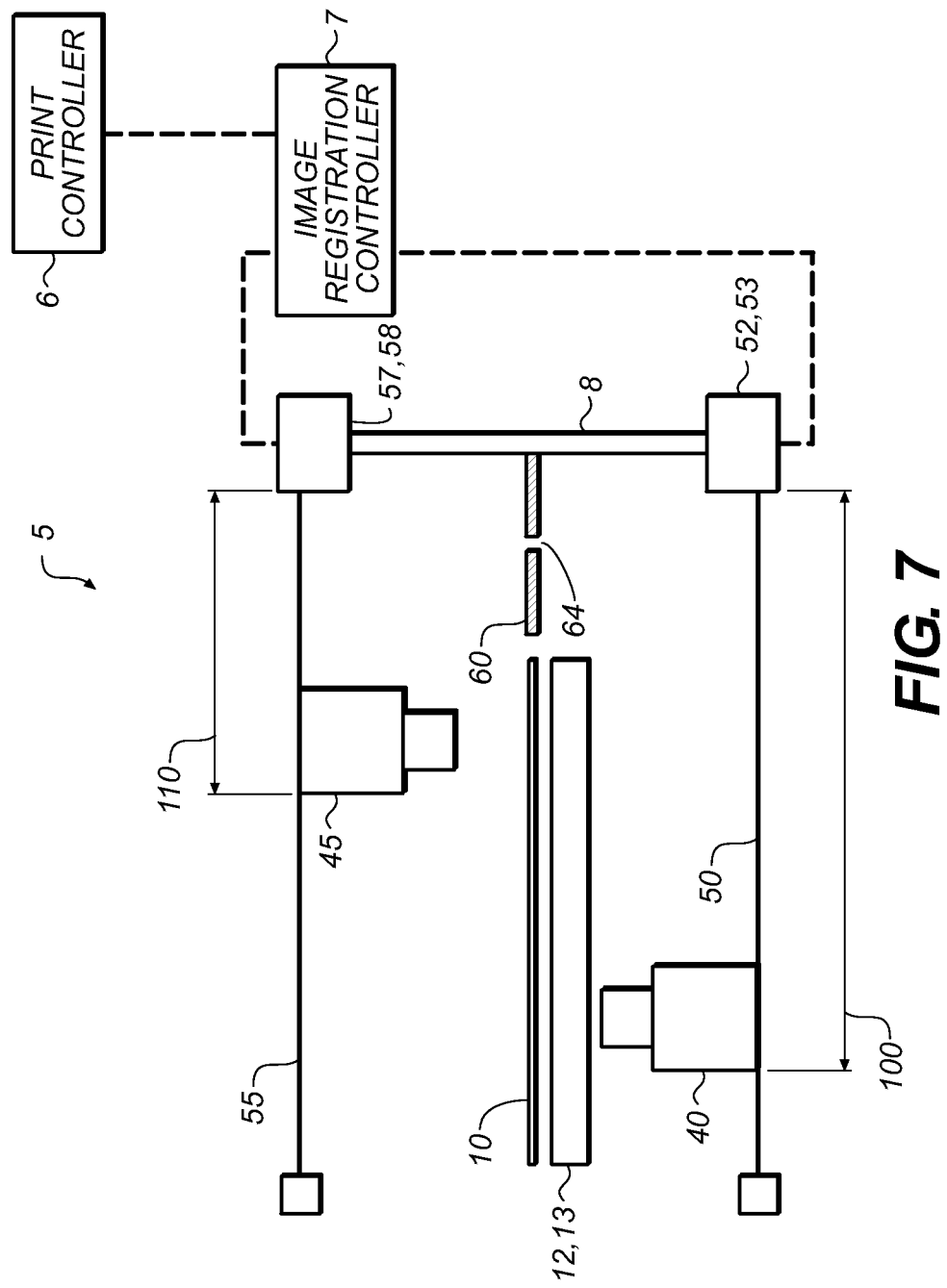
FIG. 7 is a cross section of the image registration system, taken along line A-A of FIG. 2, where the first camera and the second camera are positioned away from the fiducial, to positions where the first pattern and second patterns are viewable.

With the offset between the first and second coordinate systems determined, the first and second cameras 40, 45 can be moved in the crosstrack direction. The first camera position 100 and the second camera position 110 can be determined using the signals from the first and second encoders 53, 58 or by stepper motor pulses. As shown in FIG. 7, the cross section of the image registration system 5 when the first camera 40 has been moved in the crosstrack direction in order to view the first pattern 30 and the second camera 45 has been moved to image the second pattern 35. The first camera 45 is moved along the first camera guide 50 by the first camera drive system 52. The first encoder 53 within the first camera drive system 52 transmits a signal to the image registration controller 7, such that a first camera location 100 can be determined. The first camera guide 50 allows the first camera to move in the crosstrack direction of the print media 10. As such, only the crosstrack position of the first camera 40 changes when moved along the first camera crosstrack 50. Similarly, the second camera 45 is moved along the second camera guide 55 by the second camera drive system 57. The second encoder 58 within the second camera drives system 57 transmits a signal to the image registration controller 7 in order to determine a second camera location 110. The second camera guide 55 allows the second camera to move perpendicularly across the crosstrack of the print media 10. As such, only the crosstrack position of the second camera 45 changes when moved along the second camera guide 55.

Figure 8B:
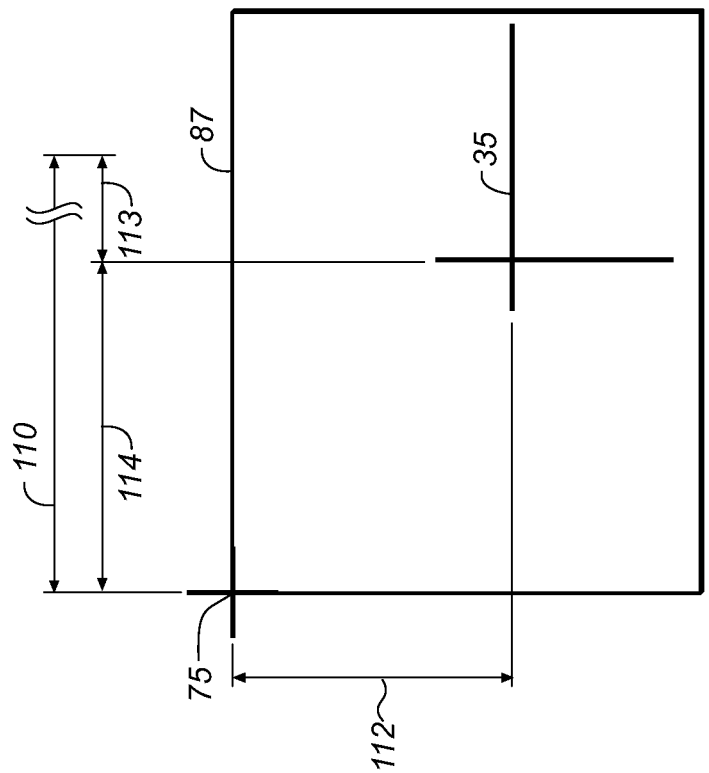
FIGS. 8A and 8B show a first pattern image captured by the first camera used to determine the location of the first pattern relative to the fiducial origin and a second pattern image captured by the second camera used to determine the location of the second pattern relative to the fiducial origin.
Figure 8A:
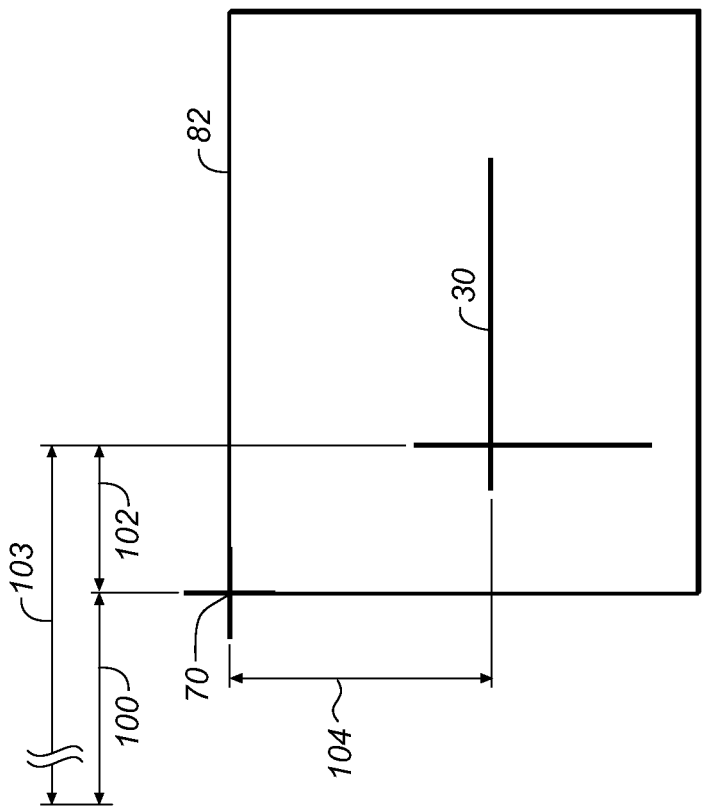

Referring to FIG. 8A, a first pattern image 82 is shown, captured by the first camera 40 when positioned below the first pattern 30 (shown in FIG. 7) is shown. The first pattern image 82 is transmitted to and processed by the image registration controller 7, which converts the first pattern image 82 into a bitmap and determines a first pattern image crosstrack location 102 and a first pattern image in-track location 104 measured relative to the first camera origin 70. The first camera location 100 is the distance from the first camera 40 to the first camera home position, as discussed above. By combining the first camera location 100 and the first pattern image crosstrack location 102, the first pattern absolute crosstrack location 103 is determined. Subtracting the first origin crosstrack absolute location 93 from the first pattern absolute crosstrack location 103 yields the crosstrack location of the first pattern 30 relative to the fiducial origin 64.

Referring to FIG. 8B, a second pattern image 85, captured by the second camera 45 when positioned over the second pattern 35 (shown in FIG. 7) is shown. The second pattern image 85 is transmitted to and processed by the image registration controller 7, which converts the second pattern image 85 into a bitmap and determines a second pattern image crosstrack location 114 and a second pattern image in-track location 112 measured relative to the second camera origin 75. The second camera location 110 is the distance from the second camera 45 to the first origin 70, as discussed above. By combining the second camera location 110 and the second pattern image crosstrack location 114, the second pattern absolute location 113 can be determined. Subtracting the second origin crosstrack absolute location 97 from the second pattern absolute location 113, yields the crosstrack location of the second pattern relative to the fiducial origin 64.

The in-track location of the first camera does not change when moved across the first camera crosstrack. As such, the first pattern in-track location 104 minus the first origin in-track location yields the in-track location of the first pattern 30 relative to the fiducial origin 64. Similarly, the second pattern in-track location 112 minus the second origin in-track location 96 yields the in-track location of the second pattern 35 relative to the fiducial origin 64. If the first and second pattern images are captured concurrently, the in-track location of the second pattern 35 relative to the fiducial origin 64 can be compared to the in-track location of the first pattern 30 relative to the fiducial origin 64 to yield the relative in-track location of the first pattern 30 and the second pattern 35. In some preferred embodiments however, the first and second pattern images are not captured concurrently. This enables the first and the second pattern images from the first and second cameras 30 and 35 to be captured using the illumination provided only by the strobe associated with the respective camera. This reduces the risk of the pattern on the opposite side of the print media from the camera showing through the print media to be captured in an image of the pattern of the same side of the print media as the camera. However, if the two pattern images are not captured concurrently, the print media will be shifted in the in-track direction between the two captured pattern images. When comparing the in-track location of the first pattern relative to the second pattern, it is necessary to account for the shift of the print media between the capture of the first pattern image and the second pattern image. The media transport system encoder 13 provides the image registration controller 7 with the signals needed to determine the amount of in-track location shift of the print media, including the first pattern and the second pattern, between the capture of the first pattern image and the second pattern image. The image registration controller then uses the first in-track pattern location 104, the second in-track pattern location 112, the first origin in-track location 90, the second origin in-track location 94, and the amount of in-track location shift of the print media to determine the in-track position of the second pattern relative to the first pattern.

Once the image registration system 5 has determined the crosstrack and in-track location of the second pattern relative to the first pattern, it provides the results to the print controller 6. Based on the relative location data supplied to the print controller 6, the print controller 6 can cause the printing of one of the sides of subsequently printed documents to be adjusted to properly register the image on the first side of the print media with the image on the second side of the print media.

Referring back to FIG. 7, it is not necessary for the first and second patterns to be located directly across the print media from each other. The first and second patterns can be designed to be offset from each other by a defined amount in both the in-track and crosstrack directions. The print controller can compare the defined offset in the in-track and crosstrack directions with the relative location in both the crosstrack and in-track direction of the first and second patterns determined by the image registration system to determine the degree of misregistration of the images on the second side of the media to the first side of the media. In some embodiments, the print controller 6 affects the change in registration in the crosstrack direction front to back by shifting the print data for either the first side or the second side laterally by one or more nozzles in the nozzle array. In other embodiments, the print controller 6 can cause the printhead to be physically shifted in the crosstrack direction to bring about the desired crosstrack image registration. In some embodiments, the print controller 6 affects the change in registration in the in-track direction by changing the cue delay, which controls the onset timing for the print of the second printhead 25 relative to the print of the first printhead 20. The cue delay is typically measured as a delay of a defined number of pulses from the media transport system encoder. In other embodiments, the print controller 6 affects the change of the in-track registration by causing the in-track position of one of the first and second printheads to be physically changed.

It is also contemplated that the fiducial 60 includes features for calibrating the first and second cameras 40, 45. Referring to FIGS. 9A-9C, various views of the fiducial 60 including a cross section view, a top focal plane view, and a bottom focal plane view, used to calibrate the magnification and focus of the first and second cameras, are shown. The fiducial 60 includes a first focal plane 65 and a second focal plane 66, each of which includes a magnification target 68 and focus targets 69-1 through 69-4. Images of the magnification targets 68 and the focusing targets 69-1 through 69-4 are captured by the first and second cameras 40, 45. The magnification targets 68 have known dimensions that are compared to the dimensions of the magnification target images, allowing the magnification of the first and second cameras 40, 45 to be calibrated. Ideally, telecentric lenses are used on the cameras so that magnification of the camera system is insensitive to the spacing between the camera and the target being imaged. The magnification target also provides means to check for rotation of the camera around the optical axis of the camera. The rotated squares 69 allow the focus of the cameras to be checked using the modulation transfer function and the slanted line method, which is known in the art. By comparing the focus of 69-1 to the focus of 69-2 and 69-3 and 69-4, it is possible to determine whether the axis of the camera 30 and 35 are perpendicular to the focal planes 65 and 66 respectively. The orientation and focus of the cameras can be adjusted based on these targets by adjusting the camera mounting hardware (not shown). The first and second focal planes 65, 66 are ideally on the same plane as the print media 10A.

In certain embodiments, there is a second two-sided fiducial positioned at a second edge of the print media 10. The second two-sided fiducial adjacent to the second edge, provides a second reference point, the first reference point provided by the first two-sided fiducial, to compare the coordinate systems of the first and second cameras, so that that parallelism of the first and second camera guides can determined. It also provides a means to check the consistency of the camera position values for the two cameras.

In some embodiments, the image registration system includes a third camera. The third camera is mounted on the same camera guide as one of the first and the second cameras. The third camera though mounted on the same camera guide as one of the first or second cameras can be positioned independently of that camera. The camera guides have sufficient length to enable both cameras mounted on the same camera guide to be positioned, at different times, to capture an image of the fiducial. This enables the two cameras mounted on the same side of the print media to be used to determine the relative location of two patterns printed on the same side of the print media.

In a similar manner, in other embodiments the image registration system includes a fourth camera. The fourth camera is mounted on the same camera guide as one of the first and the second cameras that does not include the third camera. The fourth camera though mounted on the same camera guide as one of the first or second cameras can be positioned independently of that camera. The camera guides have sufficient length to enable both cameras mounted on the same camera guide to be positioned, at different times, to capture an image of the fiducial. This enables the two cameras mounted on the same side of the print media to be used to determine the relative location of two patterns printed on the same side of the print media.

Figure 10:
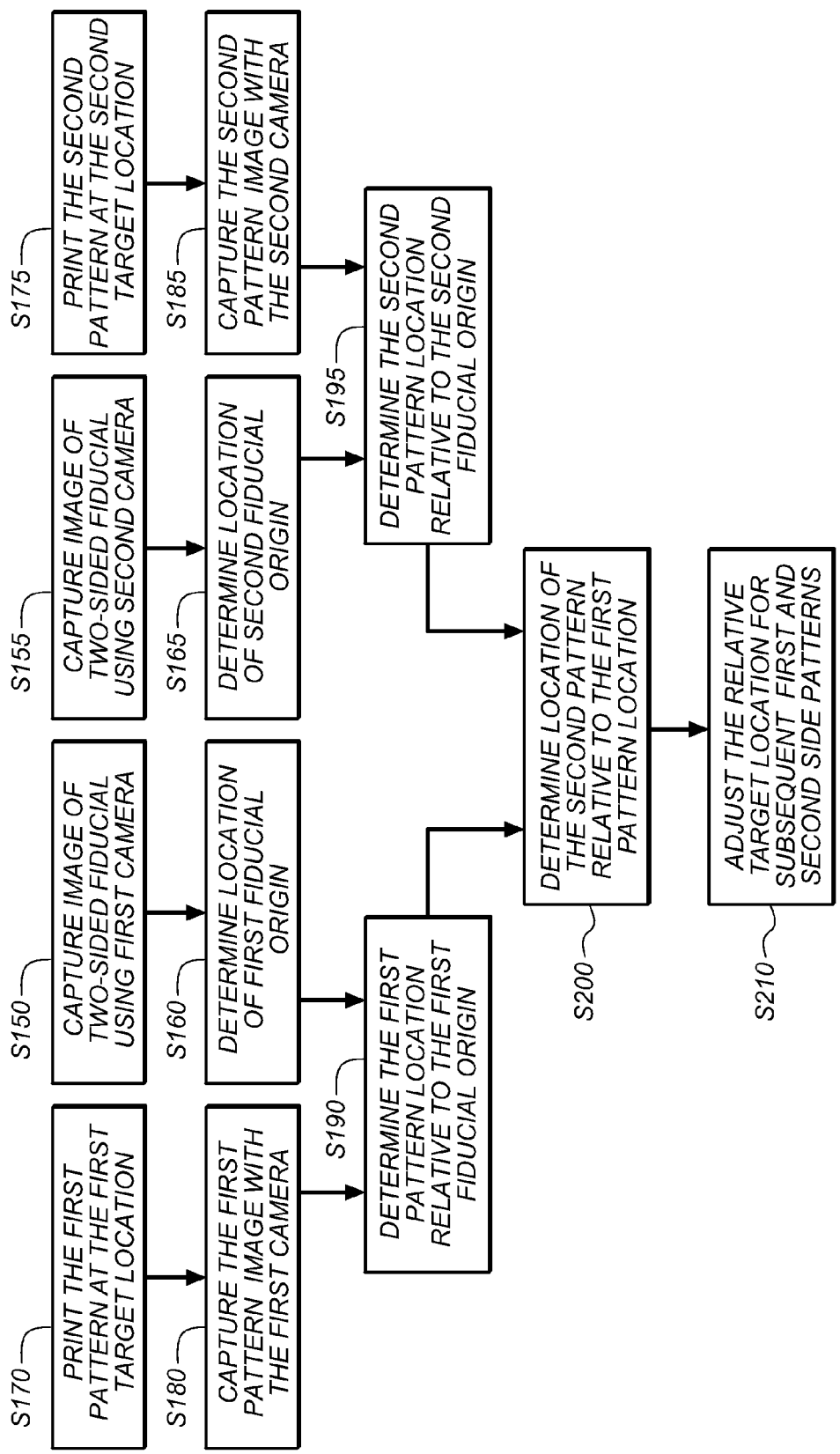
FIG. 10 is a flowchart describing a method for printing and registering the first pattern printed on the first side of the print media and the second pattern printed on the second side of the print media.

FIG. 10 is a flowchart describing a method of registering the first pattern 30 and the second pattern 40 during printing on the first side 10A and the second side 10 B of the print media 10. In Steps 150, 160, 170, 180, and 190, the first camera 40 is used to determine the location of the first pattern 30 relative to the fiducial origin of the two-sided fiducial 60. In Step 150, an image is captured by the first camera of the two-sided fiducial. In step 160, the image is analyzed to identify and determine the location of the fiducial origin. In Step 170, the print controller cues the first printhead 20 to print the first pattern 30 on the front side 10A of the print media 10 at a first target in-track and crosstrack location. In Step 180, the first pattern image 82 is captured using the first camera. In some embodiments, steps 150 and 180 can be concurrent steps as the first pattern and the first side of the fiducial can be captured in a single image as discussed above with reference to FIGS. 4A and 4B. In embodiments in which steps 150 and 180 are not concurrent, the order of steps 150 and 180 is not significant. If the first pattern and the fiducial are not captured in the same image, one or both of steps 150 and 180 can involve repositioning the camera position to the appropriate image capture location. The first pattern image 82 is sent to the image registration controller 7. Step 180 is followed by Step 190. In Step 190, the image registration controller 7 determines the first pattern 30 location relative to the fiducial origin, as described with reference to FIG. 4A or FIG. 8A.

In general, Steps 155, 165, 175, 185 and 195 are duplicates of steps 150, 160, 170, 180, and 190, respectively, but are carried out with regard to the second camera, second side of the fiducial, and the second pattern on the second side of the media. Just as steps 150 and 180 can be carried out concurrently as the first pattern and the first side of the fiducial can be captured in a single image, steps 155 and 185 can be concurrent as the second pattern and the second side of the fiducial can be captured in a single image. The time order of steps 155 and 185 need not match the time order of the steps 150 and 180. For example, in some embodiments step 180 might precede step 150, while step 155 is concurrent with or precedes step 185.

It is to be understood that Steps 150, 160, 170, and 180 determining the location of the first pattern 30 and Steps 155, 165, 175, and 185 determining the second pattern 35 location need not be performed in any particular order with respect to each other. That is, it is not necessary to determine the relative position between the first and second patterns 30, 35 concurrently, or in any particular order, because they may not be located at the same in-track location. As such, it is possible, depending on the orientation of the digital printing system 5 and the size of the printed product, that the first pattern 30 would move past the image registration system 5 prior to the second pattern 35 having been printed, or vice versa.

In Step 200, the relative location of the second pattern 35 to the first pattern is determined by the image registration controller 7, based on the location of the first pattern to the first fiducial origin and the location of the second pattern to the second fiducial origin. The controller 7 of the image registration system 5 provided the determined relative location information to the print controller of the printing system. In step 210, the print controller, in response to the relative location information of the second pattern with respect to the first pattern, affects a change in the target location for the print on the first or second side of the print media for subsequently printed documents so that the registration of the print on the first and second sides of the media is enhanced.

During operation of the image registration system 5, for example, when image registration system 5 is configured as a stand-alone or add-on system, the image registration controller 7 can be configured to receive intended print pattern location information from an outside source, for example, from a print controller. When so configured, controller 7 of the image registration system 5 can determine a deviation of the first location of the first pattern and the second location of the second pattern from an intended relative location of the first location and the second location by comparing the determined relative location of the first printed pattern and the second printed pattern with the intended print pattern information.

During operation of the printing system 1, a controller, for example, the print controller 6 or the image registration controller 7 can be configured to determine a deviation by comparing the determined relative location of the first printed pattern and the second printed pattern with the intended relative location of the first printed pattern and the second printed pattern. Using this information, the determined deviation can be compensated for by adjusting at least one of the first printhead and the second printhead such that a subsequently printed second pattern printed on the second side of the print media has the intended print location relative to a subsequently printed first pattern printed on the first side of the print media. Compensating for the determined deviation can be accomplished, typically by the print controller 6, using various techniques. For example, at least one of a first cure delay and a second cue delay can be adjusted. Print data sent from the print controller to at least one of the first preinthead and the second printhead can be adjusted so that at least one the subsequently printed first pattern printed and the subsequently printed second pattern is shifted in a crosstrack direction. Alternatively, at least one of the first printhead and the second printhead can be mechanically adjusted. For example, the crosstrack position of at least one of the first printhead and the second printhead can be mechanically adjusted.

The invention has been described in detail with particular reference to certain preferred embodiments thereof, but it will be understood that variations and modifications can be effected within the scope of the invention. For example the invention has been described in terms of embodiments in which the images printed on the first and back sides of the print media are printed by inkjet. In some embodiments, the image registration system can be used with the print media preprinted on one of the sides using offset or other printing means, and inkjet is used to print the second side of the print media. The image registration system can be employed to determine the registration between the inkjet printed image and the offset printed image.

PARTS LIST

1 Printing System
3 Digital printing system
5 Image registration system
6 Print controller
7 Image registration controller
8 Structural component
9 Cue sensor
10 Print media
10A First side
10B Second side
11 First edge
12 Media transport system
13 Encoder
15 Turnover mechanism
20 First printhead
25 Second printhead
30 First pattern
30A First pattern inverted
32 Cue mark
32A Cue mark inverted
35 Second pattern
40 First camera
45 Second camera
50 First camera guide
52 First drive system
53 First encoder
54 First camera home position
55 Second camera guide
56 Second camera home position
57 Second drive system
58 Second encoder
60 Fiducial
62A First side
62B Second side
63 Through hole
64 Fiducial origin
65 First focal plane
66 Second focal plane
68 Magnification target
69 Focusing target 70 First origin
75 Second origin
80 First fiducial image
82 First pattern image
85 Second fiducial image
87 Second pattern image
90 First origin in-track location
92 First origin crosstrack location
93 First origin crosstrack absolute location
94 Second origin in-track location
96 Second origin crosstrack location
97 Second origin crosstrack absolute location
100 First camera location
102 First pattern image crosstrack location
103 First pattern absolute crosstrack location
104 First pattern image in-track location
110 Second camera location
112 Second pattern image in-track location
113 Second pattern absolute crosstrack location
114 Second pattern image crosstrack location
118 First registration image
119 Second registration image
120 First pattern crosstrack location
122 First pattern in-track location
124 Second pattern crosstrack location
126 Second pattern in-track location
S150 Define the first origin
S155 Define the second origin
S160 Print the first pattern
S165 Print the second pattern
S170 Capture the first pattern image
S175 Capture the second pattern image
S180 Determine the first pattern location
S185 Determine the second pattern location
S190 Determine the location of the first pattern
S195 Determine the location of the second pattern
S200 Adjust the first printhead
S205 Adjust the second printhead

The invention claimed is:

1. An image registration system for determining a relative location of a first pattern printed on a first side of a print media and a second pattern printed on a second side of the print media, the image registration system comprising:
   a fiducial having a fiducial origin, a first side, and a second side;
   a first camera that captures a first fiducial image of the first side of the fiducial and the fiducial origin, and a first pattern image of the first pattern printed on the first side of the print media;
   a second camera that captures a second fiducial image of the second side of the fiducial, and a second pattern image of the second pattern printed on the second side of the print media; and
   an image registration controller that processes the first fiducial image, the first pattern image, the second pattern image, and the second fiducial image to determine the relative location of the first pattern and the second pattern.

2. The system of claim 1, the fiducial origin being a locating through hole from the first fiducial side to the second fiducial side.

3. The system of claim 2, the first fiducial side of the fiducial being reflective and the second fiducial side of the fiducial being reflective.

4. The system of claim 1, the fiducial being a reticle.

5. The system of claim 1, the fiducial being located adjacent to a first edge of the print media.

6. The system of claim 5, further comprising:
   a second fiducial attached to the structure, the second fiducial being located adjacent to a second edge of the print media.

7. The system of claim 1, further comprising:
   a first camera transport that moves the first camera in a crosstrack direction.

8. The system of claim 7, wherein the first camera transport includes an encoder that determines the position of the first camera in the crosstrack direction.

9. The system of claim 1, further comprising:
   a second camera transport that moves the second camera in a crosstrack direction.

10. The system of claim 9, wherein the second camera transport includes an encoder that determines the position of the second camera in the crosstrack direction.

11. The system of claim 1, wherein the image registration controller is configured to determine a relative location of a first fiducial origin and a second fiducial origin, determine a first pattern image location relative to the first fiducial origin, determine a second pattern image location relative to the second fiducial origin, and determine the location of the second pattern image location relative to the first pattern image location.

12. The system of claim 1, wherein the fiducial includes a magnification target and a focusing target.

* * * * *